US008564532B2

(12) United States Patent
Richardson et al.

(10) Patent No.: US 8,564,532 B2
(45) Date of Patent: Oct. 22, 2013

(54) SYSTEM AND METHODS FOR USING A MOVABLE OBJECT TO CONTROL A COMPUTER

(75) Inventors: James D. Richardson, Corvallis, OR (US); Harold Parks, Philomath, OR (US); Dean C. Wills, Corvallis, OR (US)

(73) Assignee: NaturalPoint, Inc., Corvallis, OR (US)

( * ) Notice: Subject to any disclaimer, the term of this patent is extended or adjusted under 35 U.S.C. 154(b) by 1105 days.

(21) Appl. No.: 11/948,908

(22) Filed: Nov. 30, 2007

(65) Prior Publication Data
US 2008/0129688 A1   Jun. 5, 2008

Related U.S. Application Data

(63) Continuation-in-part of application No. 11/295,808, filed on Dec. 6, 2005, now abandoned.

(51) Int. Cl.
*G09G 5/00* (2006.01)
*G09G 5/08* (2006.01)
*G06F 3/033* (2013.01)
*G06F 3/048* (2013.01)
*G06F 3/00* (2006.01)
*G01D 18/00* (2006.01)
*G01P 21/00* (2006.01)

(52) U.S. Cl.
USPC ............. 345/156; 345/8; 345/157; 715/706; 715/756; 702/87; 702/94

(58) Field of Classification Search
USPC ................... 345/4–9, 156–187; 702/94–97; 715/705–716, 756–757; 359/630–632
See application file for complete search history.

(56) References Cited

U.S. PATENT DOCUMENTS

| | | | | |
|---|---|---|---|---|
| 5,991,085 A | * | 11/1999 | Rallison et al. | 359/630 |
| 6,009,210 A | * | 12/1999 | Kang | 382/276 |
| 6,127,990 A | * | 10/2000 | Zwern | 345/8 |
| 6,353,436 B1 | * | 3/2002 | Reichlen | 345/427 |
| 6,538,649 B2 | * | 3/2003 | Bradski et al. | 345/419 |
| 7,113,151 B2 | * | 9/2006 | Kinebuchi | 345/8 |
| 7,883,415 B2 | * | 2/2011 | Larsen et al. | 463/36 |
| 2006/0080604 A1 | * | 4/2006 | Anderson | 715/701 |
| 2008/0074385 A1 | * | 3/2008 | Jouanet et al. | 345/156 |
| 2009/0128482 A1 | * | 5/2009 | Richardson | 345/156 |

OTHER PUBLICATIONS

Meers, Simon et al., "Simple, Robust and Accurate Head-Pose Tracking Using a Single Camera," *Faculty of Informatics*, University of Wollongong, 2006.

* cited by examiner

*Primary Examiner* — Bipin Shalwala
*Assistant Examiner* — Matthew Fry
(74) *Attorney, Agent, or Firm* — Alleman Hall McCoy Russell & Tuttle LLP

(57) ABSTRACT

A system for controlling a computer is provided. The system includes a position sensing apparatus configured to be disposed in operative proximity to a sensed object and thereby obtain positional data pertaining to the sensed object, and engine software configured to receive the positional data and process the positional data to determine an assessed actual position of the sensed object relative to a neutral reference position and output control commands based on the assessed actual position of the sensed object, the control commands configured to control presentation of a rendered scene, the control commands being scaled relative to changes in the assessed actual position of the sensed object, the scaling of the changes in assessed actual position of the sensed object causing presentation of the rendered scene to be skewed; wherein the engine software is further configured to automatically correct the skewing of the rendered scene by modifying the control commands.

13 Claims, 10 Drawing Sheets

SYSTEM AND METHODS FOR USING A MOVABLE OBJECT TO CONTROL A COMPUTER

CROSS-REFERENCE TO RELATED APPLICATIONS

The present application is a continuation-in-part of U.S. patent application Ser. No. 11/295,808, of Jim Richardson, Birch Zimmer, and Harold Parks for SYSTEMS AND METHODS FOR USING A MOVEABLE OBJECT TO CONTROL A COMPUTER, filed Dec. 6, 2005, the entire contents of which is hereby incorporated by reference in its entirety and for all purposes.

TECHNICAL FIELD

The present description relates to systems and methods for using a movable object to control a computer.

BACKGROUND

Motion-based control systems may be used to control computers and more particularly, motion-based control systems may be desirable for use with video games. Specifically, the interactive nature of control based on motion of a movable object, such as for example, a user's head may make the video gaming experience more involved and engrossing because the simulation of real events may be made more accurate. For example, in a video game that may be controlled via motion, a user may move their head to different positions in order to control a view of a rendered scene in the video game. Since the view of the rendered scene is linked to the user's head movements the video game control may feel more intuitive and the authenticity of the simulation may be improved.

In one example configuration of a motion-based control system, a user may view a rendered scene on a display screen and may control aspects of the rendered scene (e.g. change a view of the rendered scene) by moving their head. In such a configuration, the display screen may be fixed whereas the user's head may rotate and translate in various planes relative to the display screen. Further, due to the relationship between the fixed display screen and the user's head, the control accuracy of the user with regard to control aspects of the rendered scene may be limited by the user's line of sight of the display screen. In other words, when the user's head is rotated away from the screen such that the user does not maintain a line of sight with the display screen, the user may be unable to accurately control the view of the rendered scene. Thus, in order for the user to maintain accurate control of the rendered scene, the movements of the user's head may be scaled relative to movements of the rendered scene in order for the user to maintain a line of sight with the display screen. In other words, the magnitude of the user's actual head movements may be amplified in order to produce larger virtual movements of the virtual perspective on the display screen. In one particular example, a user may rotate their head 10° to the left along the yaw axis and the motion-based control system may be configured to scale the actual rotation so that the virtual perspective in the rendered scene may rotate 90° to the left along the yaw axis. Accordingly, in this configuration a user may control an object or virtual perspective through a full range of motion within a rendered scene without losing a line of sight with the display screen.

However, scaling the user's actual movements to change the view of the rendered scene may create relationships where a sequence of actual movements (e.g. rotations and translations) may not produce unique results in the virtual reality. For example, under some conditions two different sequences of movements by a user may produce the same result in the virtual reality. As another example, under some conditions the same sequence of movements by a user may produce different results in the virtual reality. In other words, due to the scaling of actual motion in the real world to a produce change of view (or perspective) in the virtual reality, actual space may no longer correspond one to one with virtual space (i.e. actual space and virtual space are not topologically equivalent). Further, scaling of actual movements to generate virtual movements, may cause the virtual space to be non-Euclidean, that is to say, parallel lines in the virtual space may non remain at constant distance from each and thus virtual space may not be planar, but rather may be spherical, for example.

Accordingly, in some cases, when a user performs a sequence of movements to move a virtual perspective to a desired position in the virtual reality the sequence of movements may result in the virtual perspective being position in an undesired position in the virtual reality. This phenomenon may be perceived as disorienting to the user. Moreover, the user may have to perform many sequences of movements to position the virtual perspective in a desired position in the virtual reality, which may be perceived by the user as overly tedious and may result in the user becoming frustrated.

In order to make control of the virtual perspective less disorienting and more predictable, the motion-based control system may be modified so that translation may always be performed relative to the scaled orientation of the user's head. In such a configuration, translation may be performed according to the frame of reference of the virtual perspective in virtual reality as opposed to a predefined or static frame of reference that is independent of the orientation of the virtual perspective.

In one particular example, in a flight simulation video game, a virtual perspective may have a default or starting view that is centered in the cockpit of an airplane and directed out of the front cockpit window. A user may generate a sequence of movement including rotation and/or translation herein referred to as a motion control path. The motion control path may include a yaw rotation to the left 10° and a translation toward the display screen. The motion-based control system may be configured to scale the rotation so that the virtual perspective rotates 90° so that the view is directed out the left-side cockpit window. Further, since the motion-based control system may be configured to translate the virtual perspective relative to the rotated frame of reference, the translation may cause the virtual perspective to be zoomed in on the view out of left side cockpit window. Whereas, had the motion-based control system been configured such that translation is performed independent of orientation of the user's head, the virtual perspective would translate to the left so that the view is still directed out the left side cockpit window but positioned closer to the front of the cockpit and not zoomed in. By performing translation relative to the orientation of the user's head, control of the virtual perspective may be perceived as more intuitive and natural.

However, the inventors herein have recognized that configuring the motion-based control system so that translation is always performed relative to orientation may still produce some control characteristics that are counterintuitive and disorienting, namely, translational and/or rotational skewing of the virtual perspective may occur under some conditions. This phenomenon may be most clearly perceived and particularly undesirable to a user when the user attempts to return the virtual perspective to a neutral reference position. In particular, with reference to the above described example where rotation and/or translation is scaled, in order for the user to return the virtual perspective from a second view away from the neutral reference position to the first view at the neutral reference position, the user must invert the order of the steps of the motion control path (i.e. the series of changes in orientation and/or translation) otherwise the virtual perspective may be moved to a view other than the view at the neutral reference position.

Continuing with the flight simulator example, in the above described system, in order for the user to return the virtual perspective to the origin position the user must generate a motion control path which is the inverse of the first motion control path, i.e. the user must perform a translation of their head away from the display screen and then a yaw rotation of 10° to the right. If the user simply moves their head quickly back to the origin position in a manner that may feel natural and intuitive, the virtual perspective may be placed in a position that is skewed or offset of the neutral reference position since the rotation and translation motions may be out of sequence. Accordingly, in the above described configuration of the motion-based control system, a user may have difficulty aligning the virtual perspective with the neutral reference position unless the user performs a specific series of head movements. This aspect of the motion-based control system may be negatively perceived by the user since unintuitive sequences of movements may be required to implement precise control of the virtual perspective.

DETAILED DESCRIPTION

The present description is directed to a system for controlling a computer (e.g., controlling computer hardware, firmware, a software application running on a computer, etc.) based on the real-world movements of an operator's body or other external object. The description is broadly applicable to setting where positioning of an object is used for perpetual control, although the examples discussed herein are primarily directed to control based on movements of a user's head, as detected by a computer-based position sensing system. More particularly, many of the examples herein relate to using sensed head movements to control a virtual reality software program, and still more particularly, to control display of virtual reality scenes in a game or other software that provides "first person" and/or "third person" views of a computerized scene.

Figure 1:
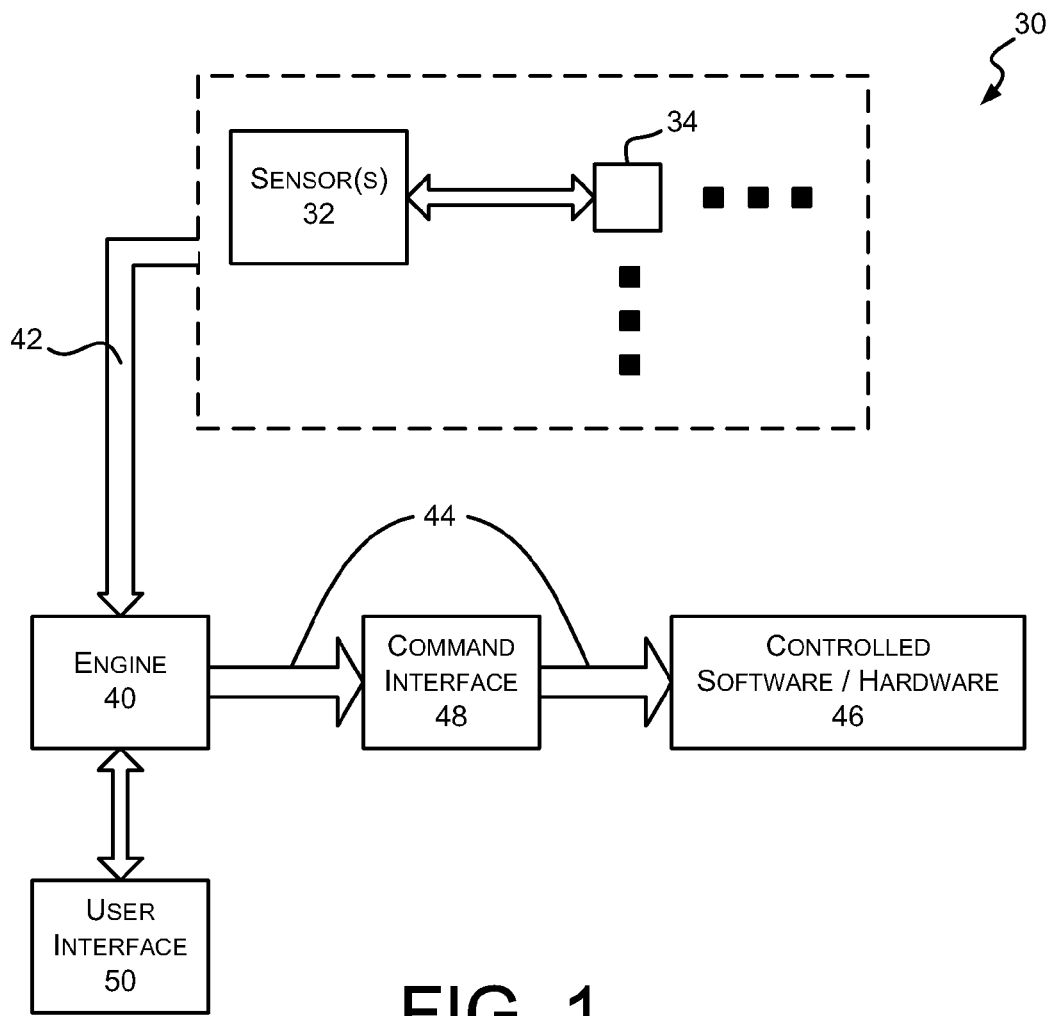
FIG. 1 is a schematic block diagram depicting a system for controlling a computer based on position and/or movement of a sensed object.

FIG. 1 schematically depicts a motion-based control system 30 according to the present description. A sensing apparatus, such as sensor or sensors 32, is responsive to, and configured to detect, movements of one or more sensed locations 34, relative to a reference location or locations. According to one example, the sensing apparatus is disposed or positioned in a fixed location (e.g., a camera or other optical sensing apparatus mounted to a display monitor of a desktop computer). In this example, the sensing apparatus may be configured to sense the position of one or more sensed locations on a sensed object (e.g., features on a user's body, such as reflectors positioned at desired locations on the user's head).

According to another embodiment, the sensing apparatus may be moveable and the sensed locations may be fixed. For example, in the setting discussed above, the camera may be secured to the user's head, with the camera being used to sense the relative position of the camera and a fixed sensed location, such as a reflector secured to a desktop computer monitor. Furthermore, multiple sensors and sensed locations may be employed, on the moving object and/or at the reference location(s). In some embodiments, the camera may be an infrared camera that detects infrared reflectors.

In the above example embodiments, position sensing may be used to effect control over rendered scenes or other images displayed generated by a computing device on a display monitor positioned away from the user, such as a conventional desktop computer monitor or laptop computer display.

Continuing with FIG. 1, sensing apparatus 32 typically is operatively coupled with engine 40, which receives and acts upon position signals or positional data 42 received from sensing apparatus 32. Engine e 40 receives these signals and, in turn, generates control signals 44 which are applied to control software/hardware 46 (e.g., a flight simulation program), which may also be referred to as the "object" or "objective" of control. Various additional features and functionality may be provided by user interface 50, as described below. It should be appreciated that the above described motion-based control system hardware and software may be implemented via various computing systems including but not limited to personal computers, laptops, gaming consoles, simulators etc. Furthermore, the engine, controlled software and/or command interface may be executable code that is stored in a storage medium of the computing system.

The object of control which may be controlled according to movements of the sensed object (e.g. a user's head) may take a wide variety of forms. As discussed above, the object of control may be a first person virtual reality program, in which position sensing is used to control presentation of first person virtual reality scenes to the user (e.g., on a display). Additionally, or alternatively, rendering of other scenes (i.e., other than first person scenes) may be controlled in response to position of the sensed object. It will be appreciated that a wide variety of other hardware and/or software control may be based on position sensing, other than control of a view of a rendered scene.

Continuing with FIG. 1, in some embodiments, the various depicted components may be provided by different vendors. Accordingly, in order to efficiently facilitate interoperability, it may be desirable to employ components such as command interface 48, to serve as translators or intermediaries between various components. Assume, for example, that the object of control is a video game that has been available for a period of time, with established commands for controlling panning/ movement of scenes and other aspects of the program. Assume further that it was originally intended that these control commands be received from a keyboard and mouse of a desktop computer. To employ the motion control described herein with such a system, it may be desirable to develop an intermediary, such as command interface 48, rather than performing a significant modification to engine software 40. The intermediary would function to translate the output of engine software 40 into commands that could be recognized and used by the video game. In many embodiments, the design of such an intermediary would be less complex than the design of engine 40, allowing the motion control system to be more readily tailored to a wide range of existing games/programs. In one example, command interface 48 may be included in a software development kit (SDK) that may be distributed to developers so that motion control setting may be easily included in software that is being developed.

Figure 2:
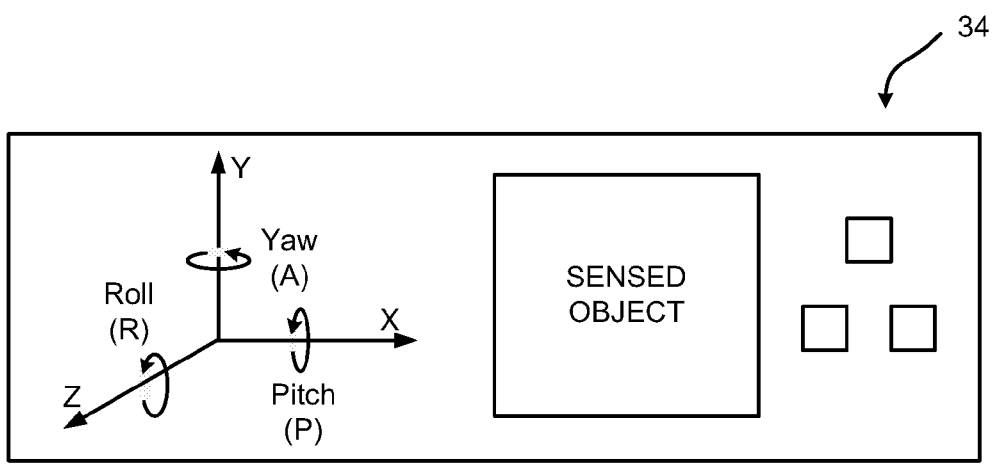
FIG. 2 depicts the sensed object of FIG. 1 and a frame of reference that may correspond to the orientation of the sensed object based on sensed locations associated with the sensed object.

Referring now to FIG. 2, the figure depicts a frame of reference that may be used to describe translational and rotational movement of the sensed object. The frame of reference for the sensed object may be determined based on position of sensed locations 34 relative to the sensing apparatus. In one particular example, sensed locations 34 may be three reflective members in a fixed configuration positioned in proximity to the head of a user. The location of the reflective members relative to a fixed location may be determined using an infrared camera. Assuming that the infrared camera is positioned in proximity to a computer display, assume the Z axis of the frame of reference represents translation of the user's head linearly toward or away from the computer display point of reference. The X axis would then represent horizontal movement of the head relative to the reference, and the Y axis would correspond to vertical movement. Rotation of the head about the X axis is referred to as "pitch" or P rotation; rotation about the Y axis is referred to as "yaw" or A rotation; and rotation about the Z axis is referred to as "roll" or R rotation. Accordingly, the sensed object may translate and/or change orientation within the frame of reference based on the reference location.

It should be appreciated that in some embodiments more or less reflective members may be implemented. Furthermore, the use of reflective members and an infrared camera is exemplary only—other types of cameras and sensing may be employed. Indeed, for some applications, non-optical motion/position sensing may be employed in addition to or instead of cameras or other optical methods.

In embodiments in which three sensed locations are employed, the positional data that is obtained (e.g., by the camera) may be represented within engine software 40 initially as three points within a plane. In other words, even though the sensed object (e.g. the user's head) is translatable in three rectilinear directions and may also rotate about three rectilinear axes, the positions of the three sensed locations may be mapped into a two-dimensional coordinate space. As explained below, the position of the three points within the mapped two-dimensional space may be used to determine relative movements of the sensed object (e.g., a user's head in the above example).

Figure 3:
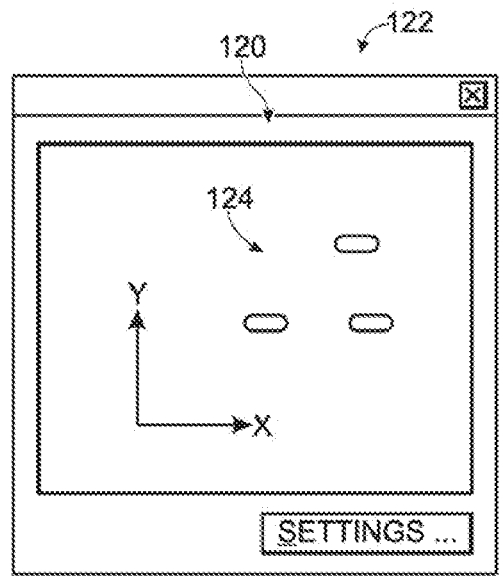
FIGS. 3 and 4 depict exemplary two dimensional mapping representations of the positions of three sensed locations of a sensed object within three dimensional space.
Figure 4:
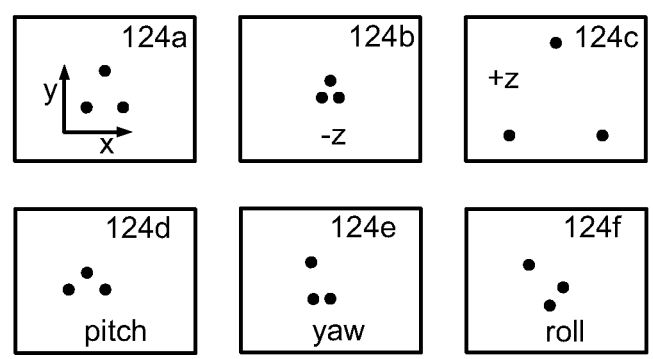

FIG. 3 depicts an exemplary view 120 of a software interface 122 depicting a two-dimensional mapping 124 based on detection of three sensed locations on a sensed object. FIG. 4 depicts six different mappings to illustrate how movement in each of the six degrees of freedom (X, Y and Z-axis translation, and rotation about the X, Y and Z axes) affects the two dimensional mapping 124. Referring first to the upper left mapping 124a, a neutral mapping is depicted corresponding to a centered reference location of the sensed object and sensed locations. For example, this reference position may correspond to the user's head being in a centered neutral position, relative to a camera mounted atop the display monitor, with the user more or less squarely facing the monitor. In this example, the computer monitor would be in the X-Y plane. Thus, translational movements of the user's head (and sensed locations) along the X and/or Y axes would result in the mapped spots shifting as indicated by the arrows in the upper left mapping. Various other movements are indicated in the other mappings of FIG. 4. Specifically, mapping 124b indicates negative Z-axis translation relative to the neutral position of mapping 124a; mapping 124c shows positive Z-axis translation; mapping 124d shows pitch rotation; mapping 124e shows yaw rotation; and mapping 124f shows roll rotation.

In some cases, it will be desirable to employ sensing methodologies and systems that result in initially obtained raw positional data that may be ambiguous. For example, in the above example, the two-dimensional mapping of the three sensor spots can yield multiple solutions when equations are applied to determine the position of the sensed object. This is partially due to the fact that, in the present example, the three sensor spots are not differentiated from each other within the mapping representation of the raw data. Referring, for example, to mapping 124a (FIG. 4), the mapping could correspond to three different rotational positions about the Z axis, each being roughly 120 degrees apart. Moreover, in the six-degrees-of-freedom system described herein, the described three-sensor approach can yield six solutions when certain computational methods are applied to the raw data. Accordingly, various empirical and temporal considerations may be implemented in engine software 40 to determine the most suitable position and orientation of the sensed object.

The two-dimensional mapping may thus be thought of as a compressed data representation, in which certain data is not recorded or represented. This compression-type feature allows the system to be simpler, to operate at higher speeds under certain conditions, and to operate with fewer sensors. Accordingly, the system typically is less costly in terms of the processing resources required to drive the data acquisition functionality of the engine software 40.

As previously discussed above, in implementations where actual and virtual movements are correlated, the present systems and methods typically employ actual-virtual movement relationships other than the one-to-one relationship described above. For example, in some configurations, rotational movements may be amplified or otherwise scaled, across the range of rotational motion, or as a function of rotational position, rotational velocity, etc. Such an approach is useful when correlating actual and virtual movements of a head. In one example of scaling, the magnitude of a user's actual head movements may be amplified to create greater virtual movement in a rendered scene. In one particular example, a user may rotate their head 10° to the left along the yaw axis and the motion-based control system may be configured to scale the actual rotation so that the virtual perspective in the rendered scene may rotate 90° to the left along the yaw axis. Accordingly, in this configuration a user may control an object or virtual perspective through a full range of motion within a rendered scene without losing a line of sight with the display screen.

Scaling actual movement of a user's head to produce virtual movement of a virtual perspective in a rendered scene may be implemented by scaling orientation and/or translation of the user's head according to the six degrees of freedom (i.e. pitch, roll, yaw, X, Y, Z). It should be appreciated that scaling may be set according to a variety of preset or customized configurations. In some embodiments, scaling may be uniform for all axes and planes. In some embodiments, rotational scaling may differ from translational scaling. In some embodiments, scaling may be set by a user such that each of the six degrees of freedom may be configured by a user. Alternatively, in some embodiments the motion-based control system may include a preset scaling configuration or various selectable preset scaling configurations may be included.

The motion-based control system may also be adapted to enable resetting or calibration of the control produced by the position and/or positional changes of the sensed object. For example, in head sensing embodiments, it may be desirable to enable the user to set or adjust the neutral centered position of the frame of reference. The neutral reference position may include an origin point or reference position from which translational and rotational movements are measured as zero or neutral. In one example, the user may initiate calibration via an input device such as a mouse, keyboard, and/or button on a game controller. The user may activate the calibration feature (e.g., incorporated into user interface and/or engine 40) so that the actual frame of reference is mapped to neutral reference position in the virtual reality, based on the position of the user's head at that instant. This resetting function may be activated at startup, from time to time during operation of the system, etc. As indicated above, the function may be activated at any time via a user-actuated input. In another embodiment, a neutral reference position may be established automatically. A combination of automatic and user-selected calibration may also be employed, for example through use of a default setpoint that is automatically selected if the user does not modify the setpoint within a specified time.

The particular neutral reference position for the sensed object (e.g., the user's head) thus may be adjustable via the resetting/calibration function. One user, for example, might prefer to be closer to the display monitor than another, or might prefer that relative movements be measured from a starting head position that is tilted forward slightly (i.e., pitch rotation). This is but one of many potential examples.

As discussed above, in a motion-based control system where a user may control a virtual perspective of a rendered scene presented on a display screen, a user's actual movements may be scaled so that the user may maintain a line of sight with the display screen and may accurately control the virtual perspective. In such a system, scaling movements (e.g. rotation and translation) may cause actual space to no longer correspond one to one with virtual space (i.e. actual space and virtual space are not topologically equivalent). Accordingly, when a user performs a sequence of movements in actual space the virtual perspective may be moved to a particular position in the virtual space. Further, the user may perform another sequence of movements to in actual space and since actual space and virtual space no longer correspond one-to-one due to scaling, the virtual perspective may not be moved to the desired position in virtual space resulting in skewing of the virtual perspective.

Skewing of the virtual perspective due to the relationship between actual space and virtual space created as a result of scaling may be particularly perceptible when attempting to move the virtual perspective to a neutral reference position in virtual space. In particular, a user may perform a series of movements that place the virtual perspective in a particular position in virtual space, then the user may return to a substantially neutral reference position in actual space and the virtual perspective unpredictably may not return to a substantially neutral reference position in virtual space but rather translational and/or rotational skewing may occur resulting in the virtual perspective being placed in an undesired position in virtual space. Skewing of the virtual perspective may require the user to perform manual calibration as described above in order to return the virtual perspective to a desired neutral reference position in virtual space. Continuous calibration of the virtual perspective by the user throughout game play may become tedious and may be perceived by the user as objectionable.

Accordingly, in order to make control of the virtual perspective less disorienting and more predictable, the motion-based control system may be modified so that translation may always be performed relative to the scaled orientation of the user's movements and, more particularly, movements of a user's head. In such a configuration, translation may be performed according to a dynamic frame of reference that changes with rotation of the virtual perspective in the virtual reality as opposed to a predefined or static frame of reference that is independent of the orientation of the virtual perspective.

In one particular example, in a flight simulation video game, a virtual perspective may have a default or starting view that is centered in the cockpit of an airplane and directed out of the front cockpit window. A user may generate a motion control path via head movements that includes a yaw rotation to the left 10° and a translation toward the display screen. The motion-based control system may be configured to scale to rotation so that the virtual perspective rotates 90° so that the view is directed out the left-side cockpit window. Further, since the motion-based control system may be configured to translate the virtual perspective relative to the rotated frame of reference, the translation may cause the virtual perspective to be zoomed in on the view out of left side cockpit window. Whereas, had the motion-based control system been configured such that translation is performed independent of orientation of the user's head the virtual perspective translate to the left so that the view is still directed out the left side cockpit window but positioned closer to the front of the cockpit and not zoomed in. By performing translation relative to the orientation of the user's head, control of the virtual perspective may be perceived as more intuitive and natural.

However, the inventors herein have recognized that configuring the motion-based control system so that translation is always performed relative to orientation may still produce some control characteristics that are unintuitive and disorienting, namely, translational and/or rotational skewing of the virtual perspective may occur under some conditions. This phenomenon may be most clearly perceived and particularly undesirable to a user when the user attempts to return the virtual perspective to a reference position. In particular, in order for the user to return the virtual perspective from a second view away from the reference position to the first view at the reference position, the user must precisely invert the order of the steps of the motion control path (i.e. the series of changes in orientation and/or translation) otherwise the virtual perspective may be moved to a view other than the view at the reference position.

Continuing with the flight simulator example, in the above described system, in order for the user to return the virtual perspective to the neutral reference position the user must generate a motion control path which is the precise inverse of the first motion control path, i.e. the user must perform a translation of their head away from the display screen and then a yaw rotation of 10° to the right. If the user simply moves their head quickly back to the origin position in a manner that may feel natural and intuitive, the virtual perspective may be placed in a position that is skewed or offset of the origin position since the rotation and translation motions may be out of sequence. Accordingly, in the above described configuration of the motion-based control system, a user may have difficulty aligning the virtual perspective with the neutral reference position unless the user performs a specific series of head motions. Alternatively, the user may have to perform frequent manual calibrations to return the virtual perspective to the neutral reference position which may be overly tedious. This aspect of the motion-based control system may be negatively perceived by the user since unintuitive sequences of motion may be required to implement precise control of the virtual perspective.

A method may be implemented via a software (and/or hardware) control routine in the motion-based control system to improve the intuitive nature of control of a virtual perspective in a rendered scene. In particular, in response to a user's actual motions, the control routine may perform scaled translation based on the orientation of the user head, that is, the control routine may reorient the frame of reference based on rotation of the sensed objected (e.g. the user's head) and may perform translation based on the reoriented frame of reference. In this way, a user may rotate to change the view of the virtual perspective in a rendered scene and translations by the user from the rotated position may generate an expected change in view of the virtual perspective (e.g. a change in zoom level).

Furthermore, the control routine may facilitate automatic alignment of a virtual perspective with a reference position (or view) independent of the motion control path performed by the user to position the virtual perspective at the desired reference position. In this way, a user may generate a motion control path to change the view of the virtual perspective in the rendered scene away from the reference position and may return the virtual perspective to the reference position without being required to perform the exact inverse of the motion control path or other calibration operations. Accordingly, the control routine may improve the intuitive feel of motion-based control of a virtual perspective in a rendered scene resulting in more precise control which may be positively perceived by the user. Moreover, positive user perceptions may result in a more realistic and immersive experience which, in turn, may be more enjoyable for the user.

Figure 5:
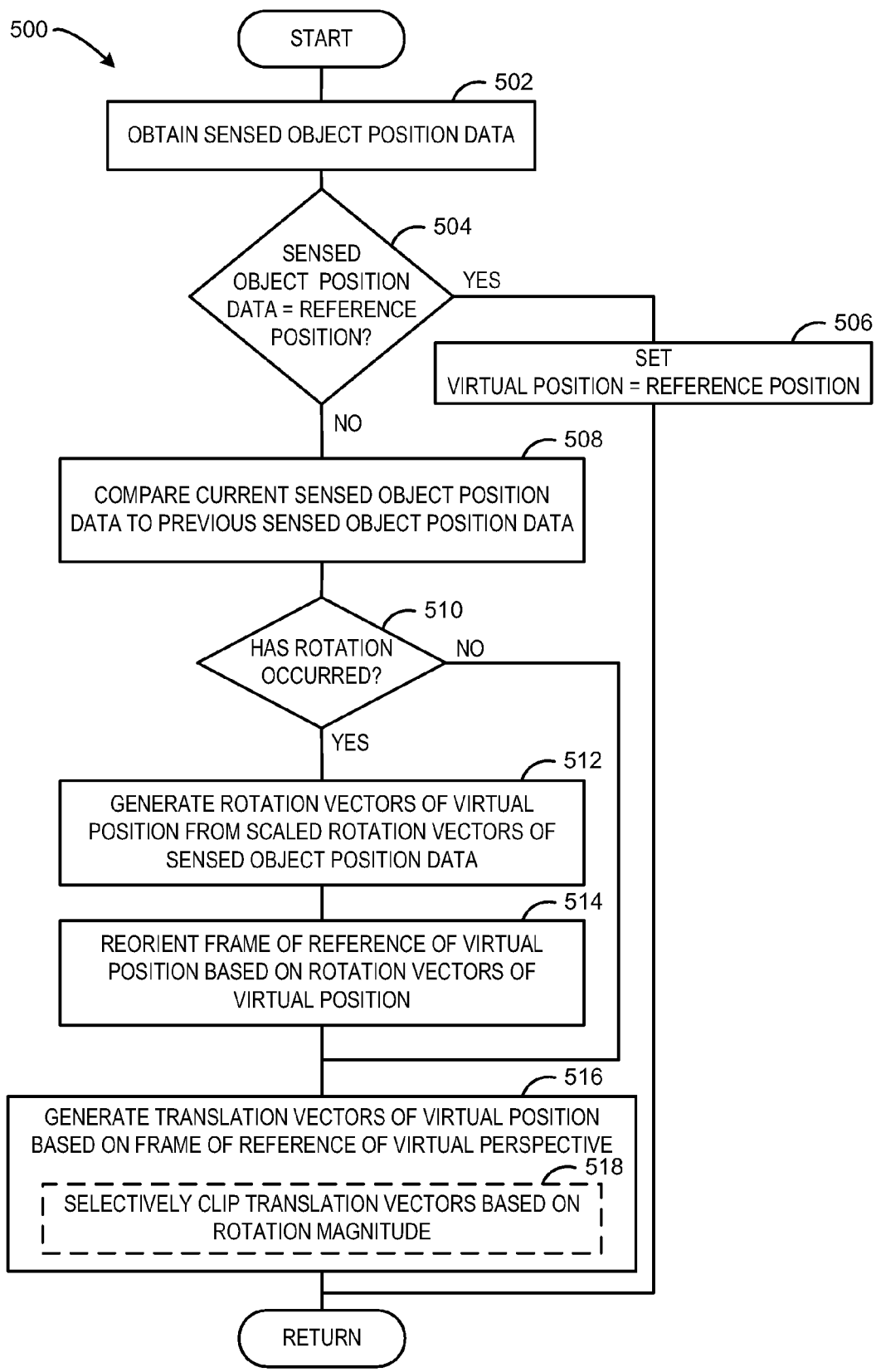
FIG. 5 depicts an exemplary method for processing positional data received from a position sensing apparatus, in order to generate commands for controlling a computer.

FIG. 5 shows an exemplary control routine for generating control commands to control a virtual perspective of a rendered scene based on motions of an object sensed by the motion-based control system. Routine 500 begins at 502, where position data of a sensed object may be obtained. The position data of the sensed object may include the location and orientation of the sensed object and may be obtained as described above (e.g. a fixed array of three sensed locations, gyroscope, accelerometers, etc.). In one particular example, sensed object position data may be derived from sensed location of a plurality of reflective members in a fixed array. In particular, the arrangement of the reflective members may be used to determine a position and orientation of the sensed object. Further, the position and orientation of the sensed object may be mapped to two-dimensional space as described above with reference to FIGS. 3-4. Note that the positional data of the sensed object may be obtained relative to a reference position.

Next at 504, the sensed object position data may be compared to the reference position to determine if the position of the sensed object is located at the reference position. As described above, the reference position may be predetermined by the motion-based control system or calibrated by the user. In one example, the reference position may be set so that the user's head is centered aligned with the center of a display screen and the user's view is facing the display screen without rotation. The reference position may include vectors for each of the six degrees (i.e. pitch, roll, yaw, X, Y, Z) that are set equal to zero. Thus, it should be appreciated that all six degrees (i.e. pitch, roll, yaw, X, Y, Z) of the sensed object position may be compared to the six degrees of the reference position. If is determined that the position of the sensed object is at the reference position, then routine 500 moves to 506. Otherwise, routine 500 moves to 508.

At 506, it has been determined that the position of the sensed object is at the reference position, and thus, the virtual position may be set to the reference position assuming that the virtual position is not already equal to the reference position. By setting the virtual position to the reference position potential translational and/or rotational skewing of the virtual perspective as a result of rotation and translation away from the reference position may be corrected and automatic calibration may achieved. Further, it should be appreciated that in some embodiments, the reference position may be expanded to include a proximal reference zone centered on the reference position. The virtual position may be set equal to the reference position when the position of the sensed object enters the proximal zone. Small movements or contractions within the proximal zone may be interpreted as attempt to move to the neutral position. Thus, the proximal zone may calibrate the virtual perspective and may account for minimal movements of the sensed object away from the reference position. It will be appreciated that calibration performed in the proximal zone may override or deviate form the control specified by the motion-based control interface. In some embodiments, calibration may be achieved over a gradient or may be stepped so that correction of the virtual perspective may be imperceptible to the user.

Continuing with routine 500, if the position data of the sensed object does not equal the reference position, then routine 500 moves to 508. At 508, the current sensed object position data may be compared to the previous sensed object position data. The comparison may be performed to assess if the sensed object has moved (i.e. rotating and/or translating). Further, under some conditions, the comparison may consider and/or discount any previous sensed object position data that has been modified by calibration or other artificial normalization. The comparison may be conducted numerous times as a polling function as the sensed object position data changes.

Next at 510, the position data of the sensed object may be assessed to determine if a change in position has occurred via rotation. If rotation of the sensed object has occurred then routine 500 moves to 512. Otherwise, routine 500 moves to 516.

At 512, it has been determined that rotation of the sensed object has occurred. Thus, rotations vectors (i.e. roll, pitch, yaw) of the virtual position may be generated. The virtual rotation vectors may be scaled (e.g. amplified) from the actual rotation vectors of the sensed object position data.

Next at 514, the frame of reference (as described above with reference to FIG. 2) of the virtual perspective may be reoriented based on the rotation vectors of the virtual position. In particular, the frame of reference may be reoriented by multiply it by the rotation vectors of the virtual position. By reorienting the frame of reference according to the rotation vectors, translations may be performed relative to the rotated frame of reference, as opposed to the frame of reference of the reference (or origin) position.

Next at 516, translation vectors (i.e. X, Y, Z) of the virtual position may be generated based on the frame of reference of the virtual perspective. In the case where rotation has not occurred, the translation vectors may be generated based on the rotation vectors of the reference position (e.g. zero rotation or directly facing the screen). In the case where rotation has occurred, the frame of reference may change with the rotation and thus the translation vectors may be multiplied by the rotation vectors of the virtual position.

At 518, the translation vectors may be selectively clipped (or scaled) based on the orientation angles created from rotation of the sensed object. In particular, the divergences of the three coordinates corresponding to the translation vectors may be determined using the absolute magnitude of the orientation angles for each rotation vector. The maximum of the divergences may be applied to the translation vectors. If the maximum divergence is beyond a predetermined threshold then the translation coordinates may be clipped or scaled. By selectively clipping the translational coordinates, translation of the virtual perspective may be smoothed to improve the control feeling perceived by the user.

Routine 500 may be implemented in the motion-based control system to improve the accuracy of control of a virtual perspective in a rendered scene when the user creates a motion control path away from the neutral reference position. It will be appreciated that moving away from the neutral reference position may include increasing the magnitude of translation and/or rotation vectors according to the six degrees of freedom. In particular, the control routine may change the frame of reference of the virtual perspective in response to rotation of the user's head in order to make translations of the virtual perspective locally correspond to the rotation in order to make control of the virtual perspective more intuitive. In other words, control of the virtual perspective may feel more intuitive because when a user is oriented in a particular direction translation of the virtual perspective may be made relative to that orientation.

Furthermore, the control routine may facilitate a user to return the virtual perspective to a neutral reference position when desired via any desired series of motions after making a series of rotations and translations away from the reference position (i.e. a motion control path) since translational and/or rotational skewing of the virtual perspective may be corrected upon reaching the reference position via calibration of the virtual perspective. In particular, by reorienting the frame of reference according to rotation and setting the virtual position to the reference position when a user's head is located at the neutral reference position in actual space, the virtual perspective may be gradually calibrated to maintain accurate control of the virtual perspective in a manner that is substantially imperceptible to the user.

Note that the example control and method routines included herein can be used with various motion control configurations. The specific routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, it should be appreciated that the method of selecting and employing one of multiple possible solutions is applicable to sensing apparatuses other than those employing a camera or other optical devices. Capacitors, gyroscope, accelerometers, etc. may be employed to perform the position sensing, for example. Also, it should be appreciated that the present systems and methods relating to resolving positional data are not limited to virtual reality video games, but are more widely applicable to any system in which the physical movements and/or position of an external object are used to control some aspect of a computer.

As discussed above, movements of an actual position of a sensed object may be modified based on the orientation or frame of reference of the sensed object to produce virtual movements of a virtual position in a rendered scene that may be perceived by a user as being natural and intuitive. In particular, when the orientation of a sensed object changes from a predetermined position and/or frame of reference, rotation and translation of the sensed object may be scaled based on the reoriented frame of reference of the sensed object to generate a virtual position.

In one example implementation, translation of a virtual position may be performed by scaling the actual translation of the sensed object relative to orientation based on scaled rotation of the sensed object. The scaled translation may be generated by performing a transformation of the translation vectors (X,Y,Z) by a rotation matrix. For example, a rotation may be demonstrated by a transformation of phi by theta where:

$$X = r^* \cos(\text{theta}) \quad (1)$$

$$Y = r^* \sin(\text{theta}) \quad (2)$$

In the first and second equations, it may be assumed the r==1 since r does not change and therefore r cancels out between the first and second equations. Thus, the transformation may be performed as follows. The transformation of phi by theta may include a cosine component and a sine component. Equation three represents the cosine component where:

$$\cos(\text{theta}+\text{phi}) = \cos(\text{theta})^*\cos(\text{phi}) - \sin(\text{theta})^*\sin(\text{phi}) = x\cos(\text{phi}) - y\sin(\text{phi}) \quad (3)$$

Further, equation four represents the sine component where:

$$\sin(\text{theta}+\text{phi}) = \cos(\text{theta})^*\sin(\text{phi}) + \sin(\text{theta})^*\cos(\text{phi}) = x\sin(\text{phi}) + y\cos(\text{phi}) \quad (4)$$

Combining the cosine component and the sine component and solving the third and fourth equations may result in a standard 2-D matrix for rotation:

$$\begin{vmatrix} \cos(phi) & -\sin(phi) \\ \sin(phi) & \cos(phi) \end{vmatrix}$$

Thus, when translation of the sensed object occurs, the translation vectors may be scaled based on orientation by applying the 2-D rotation matrix to each of the translation vectors (X,Y,Z). Accordingly, applying the 2-D rotation matrix to the X vector may result in the following 3-D matrix which may include pitch rotation:

$$\begin{vmatrix} 1 & 0 & 0 \\ 0 & \cos(pitch) & -\sin(pitch) \\ 0 & \sin(pitch) & \cos(pitch) \end{vmatrix}$$

Applying the 2-D rotation matrix to the Y vector may result in the following 3-D matrix which may include yaw rotation:

$$\begin{vmatrix} \cos(yaw) & 0 & \sin(yaw) \\ 0 & 1 & 0 \\ -\sin(yaw) & 0 & \cos(yaw) \end{vmatrix}$$

Applying the 2-D rotation matrix to the Z vector may result in the following 3-D matrix which may include roll rotation:

$$\begin{vmatrix} \cos(\text{roll}) & \sin(\text{roll}) & 0 \\ -\sin(\text{roll}) & \cos(\text{roll}) & 0 \\ 0 & 0 & 1 \end{vmatrix}$$

Note that the standard matrices invert roll and yaw. This affects sin( ) only as sin(−phi)=−sin(phi) and cos(−phi)=cos(phi).

Thus, in this example, by applying a rotational transformation to each translation vector, translation of a sensed object may be scaled to generated virtual movement of a virtual perspective in a rendered scene that may be perceived by a user as natural and intuitive.

Furthermore, scaling movements of the actual position of the sensed object relative to the orientation of the sensed object may be particularly advantageous for providing natural and intuitive motion control when the sensed object is moved away from a predetermined reference position since the user may rely more heavily on the virtual position to make accurate movements of the sensed object as compared to when the sensed object is placed proximate to the predetermined reference position.

The functionality and interrelationship of the above described components and control routines may be readily understood in the context of an aviation simulation software program. Typically, aviation simulators include a first person display or other rendered scene of the airplane cockpit, along with views through the cockpit windows of the environment outside the simulated airplane. An exemplary configuration of the described system may be employed as follows in this context: (1) an infrared camera may be mounted to the computer display monitor, and generally aimed toward the user's head; (2) the camera may be configured to detect and be responsive to movements of various sensed locations on the user's head, such as reflective spots affixed to the user's head, recognizable facial features, etc.; (3) the raw positional data obtained by the camera would be applied to engine software 40 (e.g., in the form of signals 42), which in turn would produce control signals that are applied to controlled software/hardware 46, which in this case would be the software that generates the rendered scenes presented to the user, i.e., the actual flight simulator software.

In this example, the flight simulator software and motion-control system may be supplied by different vendors/developers, as discussed above In the case of a third-party developer of the position sensing apparatus and engine software, the engine software would be specially adapted to the particular requirements of the controlled software. For example, a given flight simulator program may have a standard set of tasks that are performed (e.g., move the depicted virtual reality scene to simulate translation and rotation). The engine software would be adapted in this case to convert or translate the raw positional data into the various tasks that are performed by the flight simulator program. For example, movement of the sensed object in a first direction may correlate with task A of the flight simulator; movement of the sensed object in a second direction with task B, etc. Typically, in implementations of a virtual reality program such as a flight simulator, movements of the user's head would be used to control corresponding changes in the cockpit view presented to the user, to create a simulation in which it appears to the user that they are actually sitting in a cockpit of an airplane. For example, the user would rotate their head to the left to look out the left cockpit window, to the right to look out the right cockpit window, downward to look directly at a lower part of the depicted instrument panel, etc.

FIGS. 6A-6G provide an example of an environment in which scaling may be desirable. In a flight simulator, a non-scaled, non-amplified correlation between actual and virtual motion would require the user to rotate their head 90 degrees to the left to look squarely out the left-side virtual cockpit window. It would be difficult or impossible, however, for the user to keep their eyes on the computer display and see the displayed scene with their head rotated into that position. Accordingly, the figures show first correlation 300, including non-scaled correlations, between the actual, real world position of a user's actual head 304 (on the left of the figures) and a corresponding position of a virtual head 306 in a first person software program, such as a fight simulator game. Further, the figures show second correlations 302, including correlations between the virtual position of virtual head 306 and virtual perspective 322 which includes the view of the virtual head in relation to the virtual position. In these example figures, virtual perspective 322 depicts the view from the cockpit of an airplane located on a runway.

The left depiction in each of the figures shows a schematic representation of the actual head 304 of the user, in relation to a computer display monitor 308, which may display scenes from a flight simulator program. As previously discussed a sensor such as a camera 310, may be mounted on the computer display or placed in another location, and is configured to track movements of the user's head via sensed location 305, which may include for example three reflective members. The center depiction in each of the figures shows a schematic representation which describes a state of the flight simulator software. In each of the figures, a virtual head 306 is disposed within virtual cockpit 312, which includes a front window or windshield 314, side windows 316, back 318 and instrument panel 320. The right depiction in each of the figures shows a virtual perspective (or view) as seen by the virtual head in the virtual position.

In the present example, a translational movement is correlated with a virtual movement according to a translational frame of reference. In other words, a rectilinear frame of reference is used so that actual movement in direction A1 produces a virtual movement in direction V1, actual movement in direction A2 produces virtual movement in direction V2, and so on. The initial translation frame of reference is indicated on the left side of FIG. 6A and is as follows: (1) X axis: horizontal translational movements of actual head 304 left to right in a plane that is parallel to the plane of display 308; (2) Y axis: vertical translational movements of actual head 304 up and down in a plane that is parallel to the plane of display 308 (the Y-axis is not visible in the frame of reference legend due to the depiction being a top view); and (3) Z axis: movements in and out relative to display 308 in a direction orthogonal to the plane of display 308. Thus when the user moves their head closer to display 308, the displayed view of instrument panel 320 and out through windshield 314 is zoomed or magnified. When the user moves their head left to right (X axis) or up and down (Y axis), the view of the instrument panel and windshield displayed on display 308 pans accordingly.

Figure 6A:
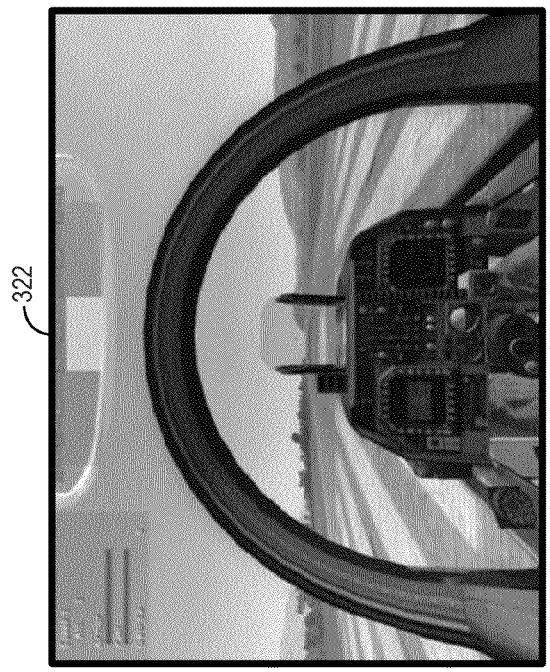
FIGS. 6A-6G depict various exemplary correlations between actual position of a sensed object and a corresponding virtual position of a virtual object or rendered scene within a computer, such as within a virtual reality computer game.
Figure 6A:
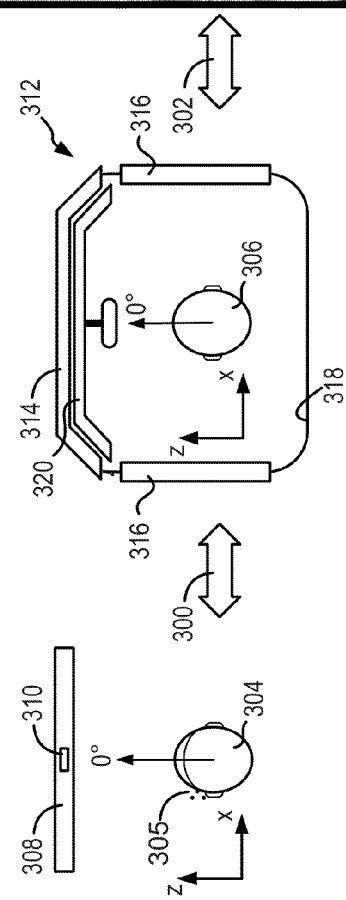
Figure 6B:
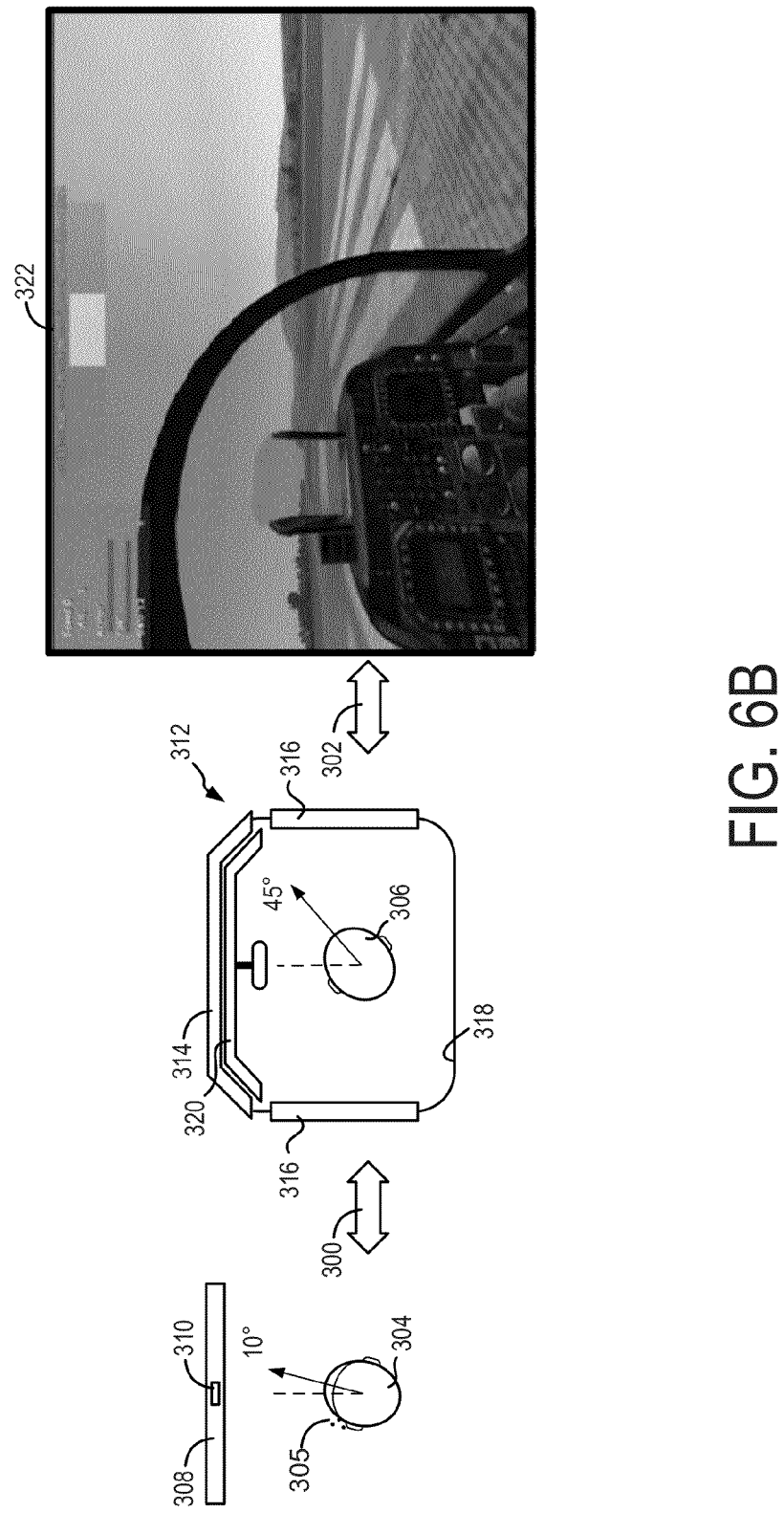
Figure 6C:
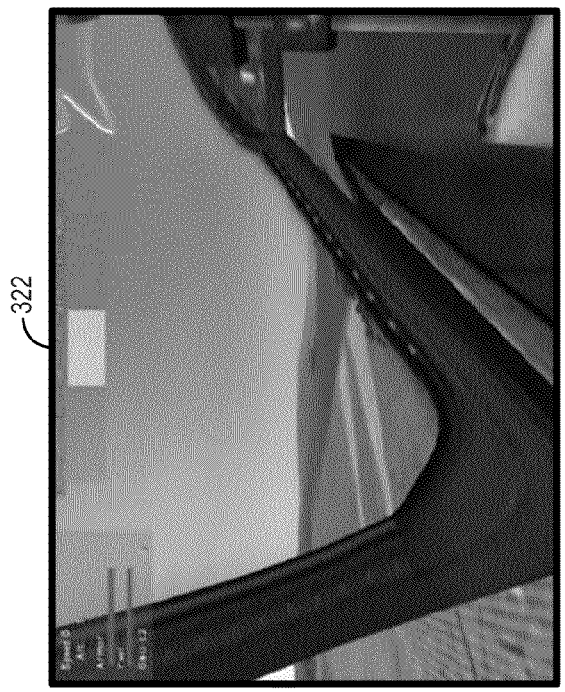
Figure 6C:
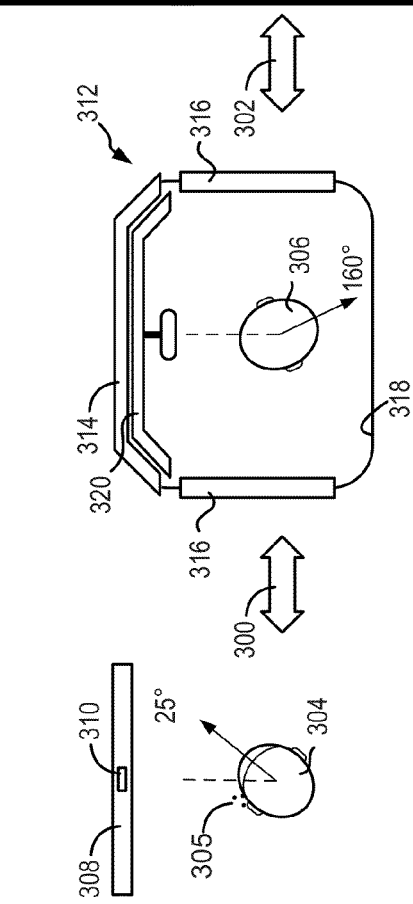
Figure 6D:
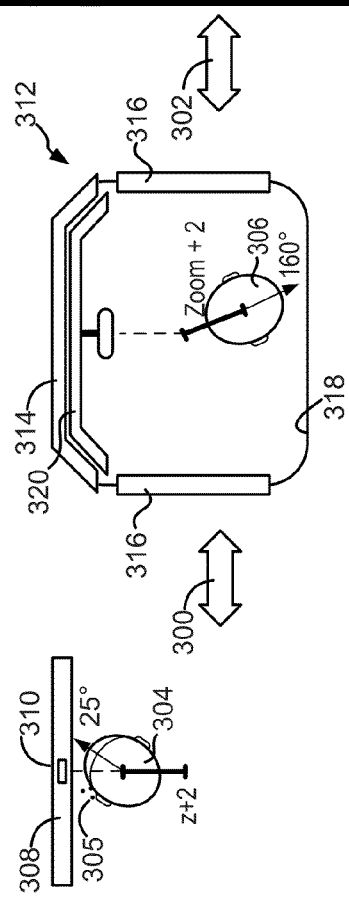
Figure 6D:

FIGS. 6A-6D depict various states of the user's head at positions that correlate to virtual positions of a virtual head that further correlate to virtual perspectives of the rendered scene of the airplane cockpit. The series of figures tracks the various states of a motion control path created by the user's head as the user rotates and translates away from the reference position. In particular, the motion control path of the user's head may result in a virtual position that is rotated 160° degrees to the right and zoomed in 2 units corresponding to a virtual perspective directed out the back of the airplane cockpit and zoomed in on a view of the runway as shown in FIG. 6D.

Figure 6E:
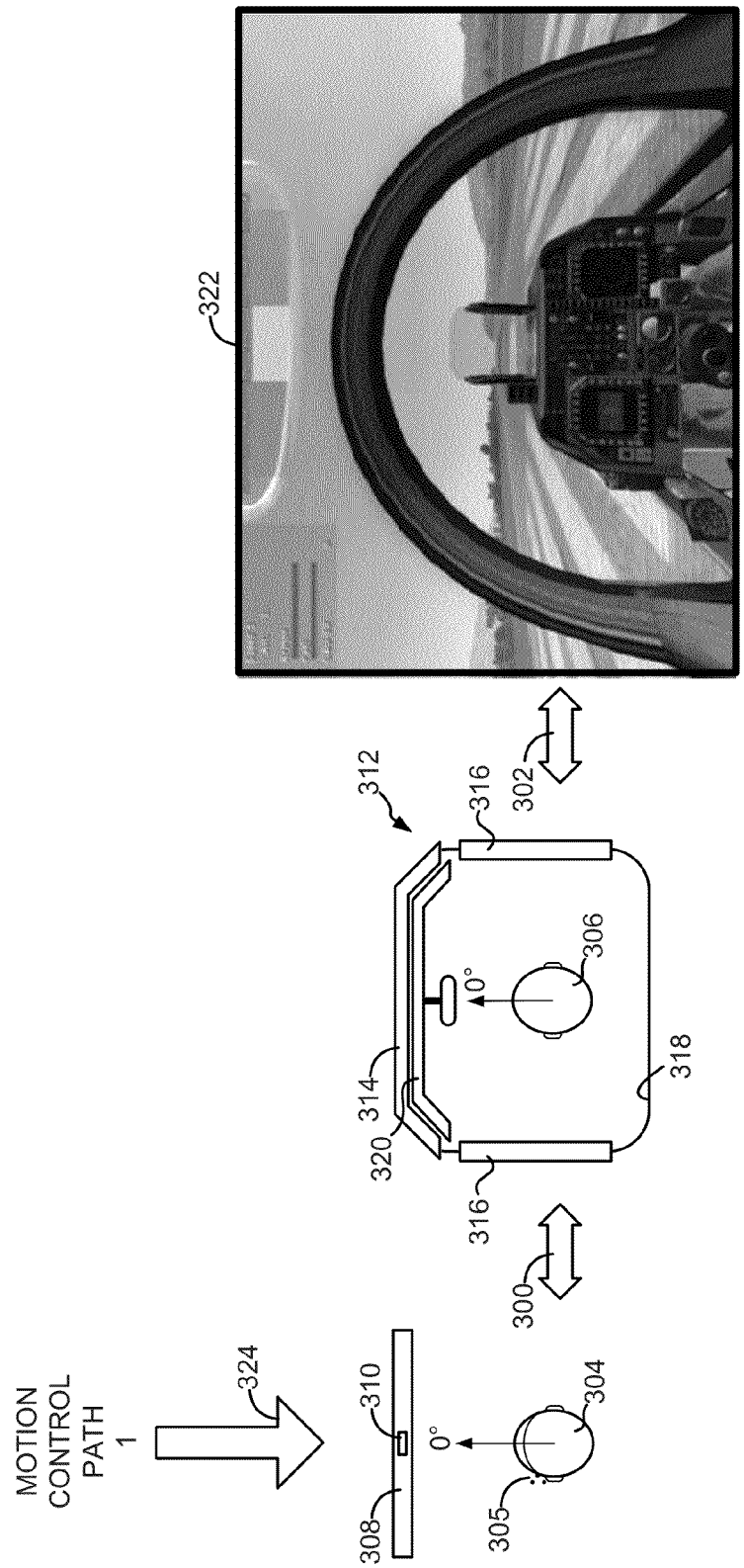
Figure 6F:
Figure 6F:
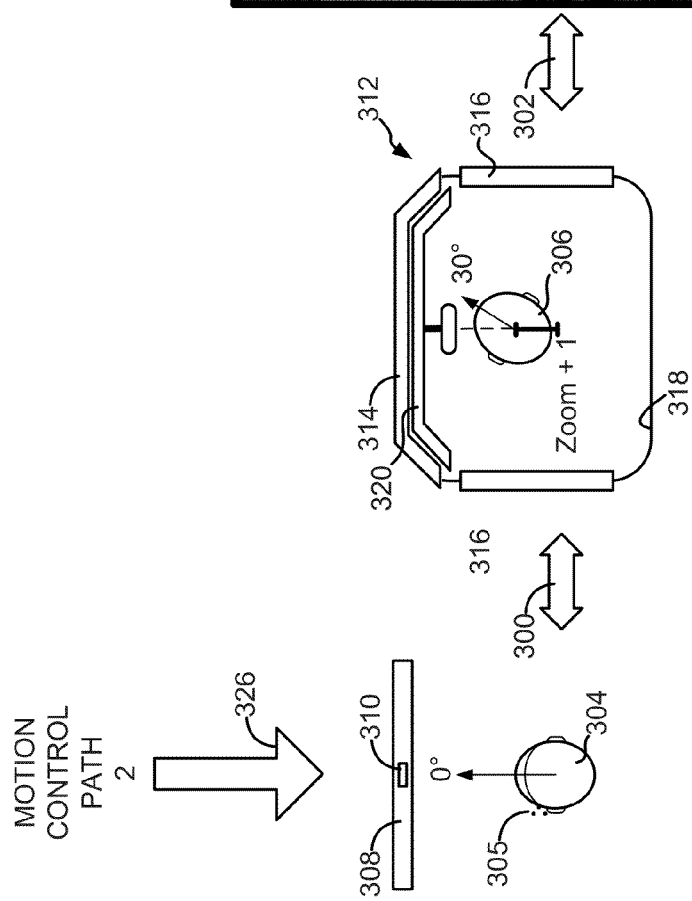

FIGS. 6E and 6F may be representative of a motion-based control system that does not implement control routine 500. Therefore, as described above unexpected control results may occur as a result of scaling since the real world and virtual reality do not correspond one to one. In particular, the frame of reference of the virtual perspective may not be reoriented as a result of rotation but rather may be based on the frame of reference of the reference position and thus translation of the virtual perspective may be unintuitive or may produce unexpected results. Further, the motion-based control system of the present example does account for translational and/or rotational skewing as a result of scaling when positioning the virtual perspective at the reference position.

Figure 6G:
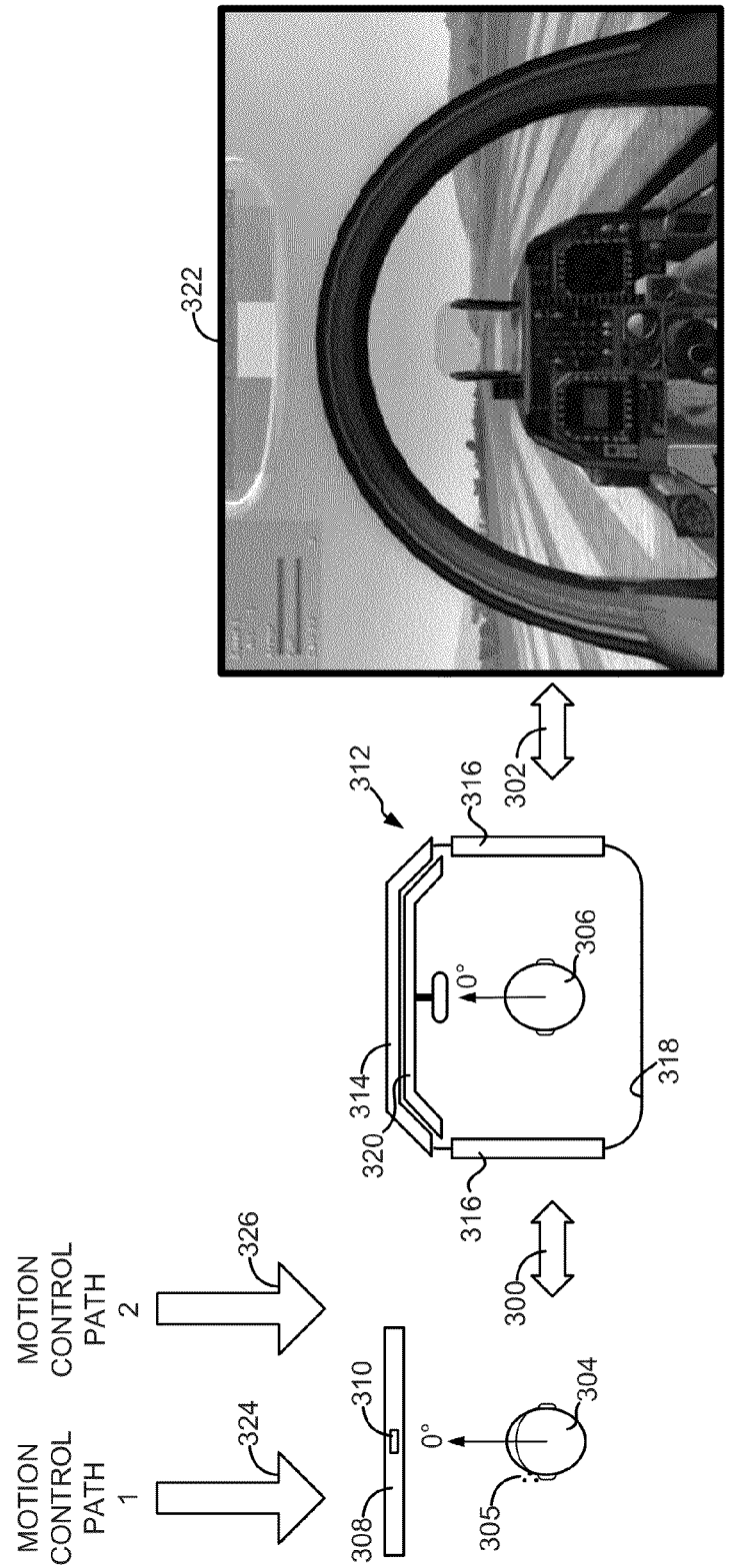

FIG. 6G may be representative of a motion-based control system that implements control routine 500. In the illustrated example, different motion control paths may produce expected results, such as for example, when a user's head returns to a reference position the virtual perspective is set to the reference position regardless of the motion control path.

Continuing with FIG. 6A, actual head 304 is depicted in a neutral, centered position relative to sensor 310 and display 308. The head is thus indicated as being in a 0° position (yaw rotation). As shown by first correlation 300, the corresponding virtual position is also 0° of yaw rotation, such that the user is presented with a view of instrument panel 320 and a view looking through the front window 314 of cockpit 312. These scenes may be displayed on display 308. As shown by second correlation 302, the corresponding virtual perspective as seen from the virtual position is shown at 322. Namely, the virtual perspective shows a forward facing view of the airplane cockpit control console and a view of the runway out of the front windshield of the airplane cockpit.

FIG. 6B depicts an upward scaling, or amplification, of yaw rotation. In a flight simulator, a non-scaled, non-amplified correlation between actual and virtual motion would require the user to rotate their head 90 degrees to the left to look squarely out the left-side virtual cockpit window. In this orientation, however, it would be difficult or impossible for the user to keep their eyes on computer display screen 308 to view the displayed scene. Accordingly, in the example of FIG. 6B, a 10° yaw rotation of actual head 304 to the right has produced a corresponding 45° rotation of the virtual head to the right, such that the user is presented (on display 308) with scene or virtual perspective 322 looking to the right out of the front windshield and the right side cockpit window 316 of virtual cockpit 312. In such a configuration, the user is able to rotate their head to the right (thus simulating the real-life motion that would be required to look to the right out a window) so as to produce a corresponding change in the depicted scene. Here, 10° of yaw rotation produces a 45° rotation of the displayed scene.

FIG. 6C similarly depicts amplification of yaw rotation, in which 25° of yaw rotation produces a 160° rotation of virtual head 306 so that the virtual head is positioned facing back 318 of simulated cockpit 312. The 25° yaw rotation of the actual head produces a 160° rotation of the virtual perspective 322 presenting the user with a view out of the rear cockpit window.

FIG. 6D depicts a state that follows the rotation performed in FIG. 6C that resulted in a 250 yaw rotation of actual head 304 that generated 160° yaw rotation of virtual head 306. Continuing with the motion control path, FIG. 6D depicts a translation of user's head 304 toward computer display screen 308 in a yaw rotated position of 25°. For ease of explanation, translation of the user's head is quantified as a distance of 2 units in the z direction from the reference position.

In this particular example, control routine 500 (see FIG. 5) may be implemented to generate control commands for translating the virtual perspective based on a rotated frame of reference. Accordingly, as shown in FIG. 6D a translation of the user's head 2 units in the z direction toward display screen 308 from a yaw rotated position of 25° may result in the virtual head translating 2 units in the direction that is rotated 160° away from the z axis since the frame of reference has been reoriented based on the rotation of the user's head. Further, the translation of the virtual head generates a zoom operation that may be applied to the virtual perspective 322. In particular, since the virtual head is translated to the back of the airplane cockpit, the virtual perspective is zoomed in on the view out of the back cockpit window.

In the below described examples, the user may desire the virtual perspective to be moved from the view of FIG. 6D back to the view from the reference position (e.g. facing forward looking out of the cockpit front windshield) as shown in FIG. 6A. In order to move the virtual perspective, the user may generate a motion control path (generally referenced at 324 and 326) in which the user's head returns to the reference position in the real world in an attempt to move the virtual perspective to the reference position in virtual reality.

Turning now to FIGS. 6E and 6F, the figures may be representative of a motion-based control system in which control routine 500 is not implemented. In this example, the motion-based control system may perform translation of the virtual perspective relative to orientation of the user's head. Accordingly, translational and/or rotational skewing of the virtual perspective may be generated as a result of this relationship. In other words, in such a configuration when the user's head is returned to the reference position via a motion control path, the virtual perspective may not be positioned at the reference position. As shown in FIGS. 6E and 6F, the user may generate motion control paths 324 and 326 in an attempt to position the virtual perspective at the reference position. Further, motion control paths 324 and 326 may result in the user's head being positioned in the real world reference position.

As shown in FIG. 6E, first motion control path 324 may result in user's head 304 being positioned at the reference position in the real world and may return virtual perspective 322 to the reference position in the virtual reality. In this example, motion control path 324 must be the inverse of the motion control path that was generated to move virtual perspective 322 from the view at the reference position in FIG. 6A to the view shown in FIG. 6D. Specifically, as discussed above, due to scaling of actual head movement in the real world to produce virtual movement, the relationship between the real world and the virtual reality are no longer one to one. As such, translation of the virtual perspective may be performed relative to the orientation of the virtual perspective. The relationship between orientation and translation may create only a single motion control path in which the virtual perspective may be aligned with the reference position when a user's head returns to the reference position in the real world.

As shown in FIG. 6F, second motion control path 326 which differs from motion control path 324 (i.e. a different series of rotations and translations) may result in user's head 304 being positioned at the reference position in the real world. However, in this example, the motion-based control system is configured such that translation of the virtual perspective is always performed relative to orientation, thus only one motion control path (i.e. motion control path 324) may align the virtual perspective at the reference position. Thus, motion control path 326 may result in virtual head 306 and virtual perspective 322 being skewed from the desired reference position by a yaw rotation of 10° and a zoom operation of 1 unit toward the cockpit front windshield. In particular, since the real world and the virtual reality do not share the same topology, the scaling that occurs may shift the virtual perspective to an unexpected position. Further, the user may have to make multiple attempts to position the virtual perspective at the reference position. Accordingly, the user may perceive the motion-based control system in a negative manner since the motion-based control system may be perceived as being unintuitive or as having imprecise control.

In contrast, FIG. 6G may be representative of a motion-based control system in which control routine 500 is implemented. As described above, control routine 500 may control translation of the virtual perspective relative to the orientation of the virtual head when the user's head is positioned away from the reference position. Further, control routine 500 may automatically align the virtual perspective with the reference position when the user's head returns to the reference position. Accordingly, control routine 500 may be executed by the motion-based control system in order to control the virtual perspective of a rendered scene where the control may be perceived by the user as intuitive because translation is performed relative to orientation. Moreover, control may be perceived by the user as being more accurate because translational and/or rotational skewing of the virtual perspective that occurs as a result of the relationship between translation and orientation may be corrected.

As shown in FIG. 6G, first motion control path 324 and second motion control path 326 may be two different sequences of rotations and translations that the user may perform as attempts to return virtual perspective 322 to the reference position. Both motion control paths may result in user's head 304 being positioned in the real world reference position. Further, control routine 500 may manipulate positional data generated from each of motion control paths 324 and 326 to position the virtual head 306 at the virtual reference position and thus the motion-based control system may generate virtual perspective 322 showing a view from the reference position in the airplane cockpit. Accordingly, by executing control routine 500, the motion-based control system may manipulate positional data generated via movements of the user's head to align the virtual perspective with the reference position when the user's head moves to the reference position. In this way, translational and/or rotational skewing of the virtual perspective may be corrected in a manner that is substantially imperceptible to the user so that the virtual perspective may be aligned with the reference position when the user's head moves to the reference position regardless of the motion control path generated by the user.

It will be appreciated that a wide variety of correlations may be employed between the actual movement and the control that is effected over the computer. In virtual movement settings, correlations may be scaled, linearly or non-linearly amplified, position-dependent, velocity-dependent, acceleration-dependent, rotation-dependent etc. Furthermore, in a system with multiple degrees of freedom or types of movement, the correlations may be configured differently for each type of movement. For example, in the six-degrees-of-freedom system discussed above, the translational movements could be configured with deadspots, and the rotational movements could be configured to have no deadspots. Furthermore, the scaling or amplification could be different for each of the degrees of freedom.

It should be appreciated that in some embodiments of the motion-based control system, control routine 500 may be selectively executed to correct skewing of the virtual perspective. Operation of the control routine may be selectable by a user before or during game play as part of a game play setup. Alternatively, the control routine may be selectively executed based on various characteristics of different games Although FIGS. 6A-6G depict examples of a flight simulator game with a first person view. It should be appreciated that the above described system and methods may be applicable to various different software and video game applications. In particular, the system and methods may be used with video games that feature a virtual perspective from the first person or third person.

It will be appreciated that the embodiments and method implementations disclosed herein are exemplary in nature, and that these specific examples are not to be considered in a limiting sense, because numerous variations are possible. The subject matter of the present disclosure includes all novel and nonobvious combinations and subcombinations of the various intake configurations and method implementations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. An input peripheral system for controlling a computer, comprising:

a sensing apparatus configured to obtain positional data, such positional data varying in response to translational and rotational movement of a user's head; and engine software operatively coupled with the sensing apparatus and configured to produce control commands based on the positional data, the control commands being operable to produce, in a virtual reality program running on the computer, virtual movement of a first person perspective that is displayed to the user, where the sensing apparatus and engine software are configured so that, when the user's head is in a first rotational position, the control commands produced by the engine software for a selected translational movement of the user's head produce virtual movement in a virtual direction that is different than that produced for such selected translational movement when the user's head is in a second rotational position;

wherein changes between the first and second rotational positions cause the selected translational movement to cause presentation of the first person perspective to be skewed; and wherein the engine software is further configured to automatically correct translation skewing of the first person perspective by detecting a substantially neutral reference position in actual space and returning the virtual perspective of a particular position in virtual space to a substantially neutral reference position in virtual space, wherein the translation skewing is caused by translational scaling performed relative to a change in rotational position.

2. A method of controlling a computer, comprising:
obtaining positional data using a sensing apparatus placed in operative proximity to a user's head, the positional data varying in response to translational and rotational movements of the user's head;
in a virtual reality program, moving a displayed first person perspective in response to the positional data, where such moving of the displayed first person perspective includes:
when the user's head is in a first rotational position, moving the displayed first person perspective in a first virtual direction in response to a selected translational movement of the user's head;
when the user's head is in a second rotational position, moving the displayed first person perspective in a second virtual direction which is different than the first virtual direction, in response to the selected translational movement of the user's head; and
automatically correcting translation skewing of the first person perspective by detecting a substantially neutral reference position in actual space and returning the virtual perspective of a particular position in virtual space to a substantially neutral reference position in virtual space, wherein the translation skewing is caused by translational scaling that is performed relative to a change in the first and second rotational positions.

3. The input peripheral system of claim 1, wherein automatically correcting translation skewing of the first person perspective includes at least one of rotating the first person perspective and translating the first person perspective.

4. The input peripheral system of claim 1, wherein automatically correcting translation skewing of the first person perspective includes aligning the first person perspective with the substantially neutral reference position in virtual space when the obtained positional data indicates that the user's head is substantially aligned with the substantially neutral reference position in actual space.

5. The input peripheral system of claim 4, wherein the substantially neutral reference position in virtual space is located at substantially a center of the virtual space.

6. The input peripheral system of claim 1, wherein producing the control commands based on positional data includes amplifying at least one of rotation and translation of the user's head.

7. The input peripheral system of claim 1, wherein at least one of the substantially neutral reference position in actual space and the substantially neutral reference position in virtual space is predetermined.

8. The input peripheral system of claim 1, wherein at least one of the substantially neutral reference position in actual space and the substantially neutral reference position in virtual space is established via a startup routine.

9. The method of claim 2, wherein automatically correcting translation skewing of the first person perspective includes at least one of rotating the first person perspective and translating the first person perspective.

10. The method of claim 2, wherein automatically correcting translation skewing of the first person perspective includes aligning the first person perspective with the substantially neutral reference position in virtual space when the obtained positional data indicates that the user's head is substantially aligned with the substantially neutral reference position in actual space.

11. The method of claim 10, wherein the substantially neutral reference position in virtual space is located at substantially a center of the virtual space.

12. The method of claim 2, wherein at least one of the substantially neutral reference position in actual space and the substantially neutral reference position in virtual space is predetermined.

13. The method of claim 2, wherein at least one of the substantially neutral reference position in actual space and the substantially neutral reference position in virtual space is established via a startup routine.

* * * * *